United States Patent
Drymiller

(10) Patent No.: US 10,325,516 B1
(45) Date of Patent: Jun. 18, 2019

(54) SYSTEM AND METHOD FOR TEACHING ARITHMETIC

(71) Applicant: David Drymiller, Bartlett, IL (US)

(72) Inventor: David Drymiller, Bartlett, IL (US)

(*) Notice: Subject to any disclaimer, the term of this patent is extended or adjusted under 35 U.S.C. 154(b) by 287 days.

(21) Appl. No.: 15/177,892

(22) Filed: Jun. 9, 2016

Related U.S. Application Data

(60) Provisional application No. 62/217,034, filed on Sep. 11, 2015.

(51) Int. Cl.
*G09B 19/02* (2006.01)
*A63F 3/00* (2006.01)

(52) U.S. Cl.
CPC .......... *G09B 19/02* (2013.01); *A63F 3/00006* (2013.01); *A63F 3/00697* (2013.01); *A63F 3/00895* (2013.01)

(58) Field of Classification Search
CPC .................................. G09B 19/02; A63F 3/00
See application file for complete search history.

(56) References Cited

U.S. PATENT DOCUMENTS

| | | | |
|---|---|---|---|
| 4,092,029 A * | 5/1978 | Jones | A63F 3/00 273/271 |
| 5,273,430 A | 12/1993 | Strychewski | |
| 5,679,002 A | 10/1997 | Scelzo | |
| 5,688,126 A | 11/1997 | Merritt | |
| 5,782,471 A | 7/1998 | Bautista et al. | |
| 5,918,882 A * | 7/1999 | Truong | A63F 3/0478 273/249 |
| 5,927,717 A * | 7/1999 | Berkovi | A63F 3/0415 273/271 |
| 6,089,871 A | 7/2000 | Jaffe | |
| 6,648,648 B1 * | 11/2003 | O'Connell | A63F 3/0415 273/236 |
| 7,077,654 B2 | 7/2006 | Burtness | |
| 8,128,407 B2 | 3/2012 | Brett | |
| 8,708,703 B2 | 4/2014 | Fluster | |
| 2011/0275038 A1 | 11/2011 | Penner | |
| 2013/0026710 A1 | 1/2013 | Sambriski | |

FOREIGN PATENT DOCUMENTS

| | | |
|---|---|---|
| CN | 101557863 A | 10/2009 |
| GB | 2393132 B | 4/2006 |
| WO | 2008063044 A1 | 5/2008 |

* cited by examiner

*Primary Examiner* — Eddy Saint-Vil
(74) *Attorney, Agent, or Firm* — Paul J. Nykaza; Michael R. Schacht; Schacht Law Office, Inc.

(57) ABSTRACT

A system and method for teaching arithmetic has a plurality of training aides or manipulatives wherein a child/student learns arithmetic facts by executing the method using the system. The physical training aids may include a plurality of dice (10,12), a numerical board (20), a plurality of pennies (26) and a container (22). The physical training aids are used with the child where the child creates addition/subtraction problems by rolls of the dice (10,12) wherein the child uses the numerical board (20) and container (22) along with the pennies (26) to solve problems and verify answers by direct observation. Games may be incorporated where the child can use the system and method in playing the games.

20 Claims, 15 Drawing Sheets

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

FIG. 8

ZOEY'S & LUCY'S RACE TO 100

| 1 START | 2 | 3 | 4 | 5 | 6 | 7 | 8 | 9 | 10 |
|---|---|---|---|---|---|---|---|---|---|
| 36 ← 37 | 37 | 38 | 39 | 40 | 41 | 42 | 43 | 44 | 11 |
| 35 | 64 ← | 65 ← | 66 | 67 | 68 | 69 | 70 | 45 | 12 |
| 34 | 63 | 84 ← | 85 ← | 86 | 87 | 88 | 71 | 46 | 13 |
| 33 | 62 | 83 | 96 | 97 ← FINISH | 98 | 89 | 72 | 47 | 14 |
| 32 | 61 | 82 | 95 | 100 | 99 | 90 | 73 | 48 | 15 |
| 31 | 60 | 81 | 94 | 93 | 92 | 91 | 74 | 49 | 16 |
| 30 | 59 | 80 | 79 | 78 | 77 | 76 | 75 | 50 | 17 |
| 29 | 58 | 57 | 56 | 55 | 54 | 53 | 52 | 51 | 18 |
| 28 | 27 | 26 | 25 | 24 | 23 | 22 | 21 | 20 | 19 |

| NAME | POSITION ON BOARD | 1ST LEVEL RACE TO 100 | NAME | POSITION ON BOARD |
|------|------|------|------|------|
| 9 | 9 | | | |
| 3 | 12 | | | |
| 7 | 19 | | | |
| | | | | |
| | | | | |
| | | | | |
| | | | | |
| | | | | |
| | | | | |
| | | | | |
| | | | | |

FIG. 11

| NAME | | | | | 2ND LEVEL RACE TO 100 | POSITION ON BOARD | |
|---|---|---|---|---|---|---|---|
| ⬠ | + | ⬡ | = | ☐ | | | 0 |
| 5 | + | 7 | = | 12 | | 1 | 2 |
| 4 | + | 3 | = | 7 | | 1 | 9 |
| 6 | + | 8 | = | 14 | | 3 | 3 |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

NAME     3RD LEVEL RACE TO 100     POSITION ON BOARD     -38

| ⬠ | + | ⬡ | = | ▭ | | | | 0 | | |
|---|---|---|---|---|---|---|---|---|---|---|
| 5 | + | 6 | = | 11 | | + | 1 | 1 | | |
| 9 | + | 3 | = | 12 | | + | 1 | 2 | | |
| 4 | + | 2 | = | 6  | | | 2 | 3 | | |
| 7 | + | 8 | = | 15 | | + | | 6 | | |
|   |   |   |   |    | | | 2 | 9 | | |
|   |   |   |   |    | | + | 1 | 5 | | |
|   |   |   |   |    | | | 4 | 4 | | |

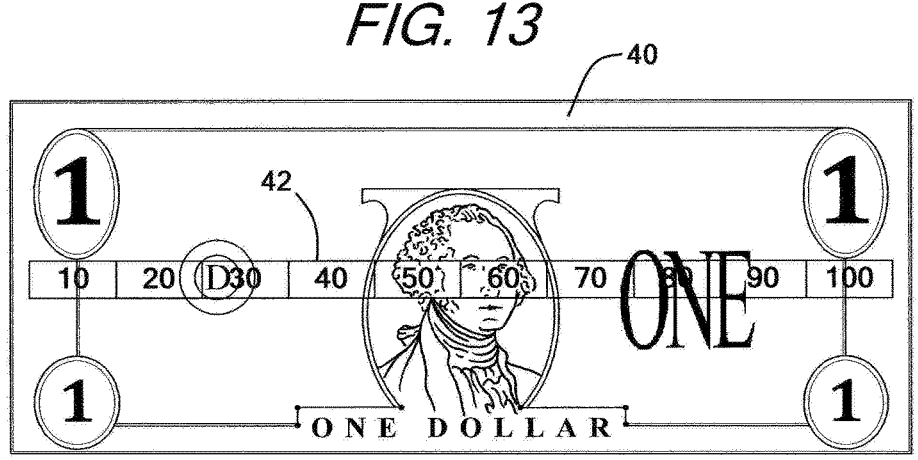
FIG. 13
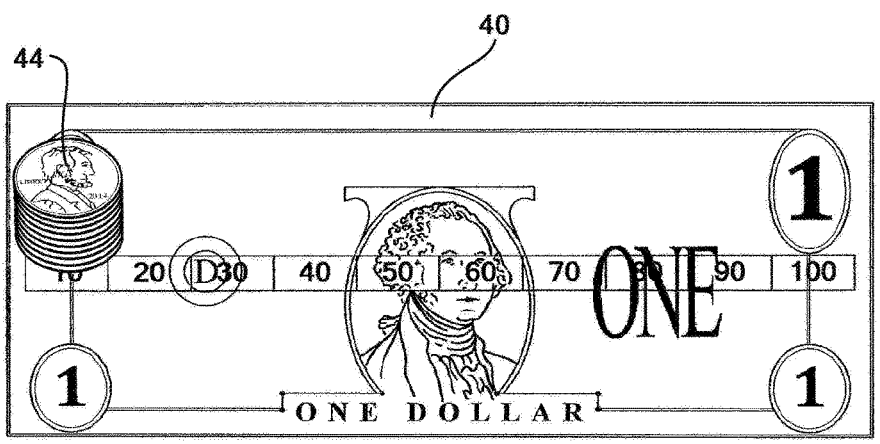
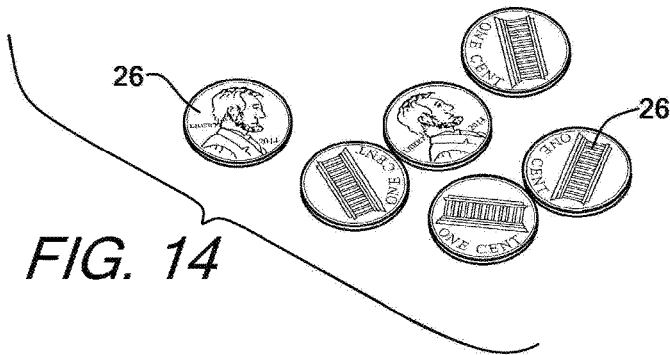
FIG. 14

FIG. 16

NAME PLAYER A     THE DOLLAR GAME     NAME PLAYER B    46

DICE ROLL SUM             DICE ROLL SUM

| ⬠ | + | ⬡ | = |   |
|---|---|---|---|---|
| 8 | + | 6 | = | 14 |
| 4 | + | 7 | = | 11 |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |

| ⬠ | + | ⬡ | = |   |
|---|---|---|---|---|
| 3 | + | 4 | = | 7 |
| 6 | + | 9 | = | 15 |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |

FIG. 21

THE GRAVITY GAME
1ST LEVEL
DIFFERENCE

| NAME PLAYER A | | | | | | | NAME PLAYER B |
|---|---|---|---|---|---|---|---|
| DIE ROLL | | ⬠ | - | ⬡ | = | ☐ | DIE ROLL |
| 7 | | 7 | - | 5 | = | 2 | 5 |
| 3 | | 8 | - | 3 | = | 5 | 8 |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

SYSTEM AND METHOD FOR TEACHING ARITHMETIC

CROSS-REFERENCE TO RELATED APPLICATIONS

The present application claims the benefit of U.S. Patent Application No. 62/217,034, filed on Sep. 11, 2015, which application is expressly incorporated by reference herein.

FEDERALLY SPONSORED RESEARCH OR DEVELOPMENT

None.

TECHNICAL FIELD

The invention relates generally to a system and method for teaching arithmetic and, in particular, to physical training aids used in a method that allows a child to learn arithmetic more efficiently and wherein the method can be applied in a plurality of games in further learning arithmetic.

BACKGROUND OF THE INVENTION

Arithmetic is a basic skill that is very important for children to master. It is important because becoming skillful in arithmetic and mathematics allows one to do other things correctly. Becoming skillful in basic arithmetic such as addition and subtraction is needed before proceeding to other mathematical techniques such as multiplication and division and even further advanced mathematical operations such as algebra, trigonometry, geometry and calculus. General arithmetic such as addition and subtraction tends to be difficult for children to learn. The attention span of many children is short, and children often do not consider learning arithmetic to be fun. Furthermore, typical arithmetic teaching methods focus on straight memorization. Thus, children can often become easily distracted and disengaged. Even many currently-available arithmetic-related games focus on memorization. Also, when children do not learn arithmetic quickly, they tend to automatically conclude that they do not like math. This perpetuates the difficulties of learning arithmetic. Other prior art methods require children to count and mark up a number line in order to perform addition and subtraction problems. This often leads to children experiencing difficulties as the children inadvertently lose track of proper locations on the number line while counting and marking along the number line. Children's eye movements at this age level are lacking which leads to mistakes in using the number line. A more innovative method using unique physical training aids, or manipulatives that children can relate to will allow children to learn basic arithmetic quicker and more efficiently.

While such arithmetic methods, systems and games according to the prior art provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a system and method for teaching arithmetic that can also be used in a plurality of different games. By playing the games repeatedly, a child/player learns arithmetic facts. By using the system and method correctly, the child/player does not provide a wrong answer as the system and method eliminates the chance for a wrong answer.

According to a first aspect of the invention, the system and method for teaching arithmetic includes a plurality of physical training aides. The physical training aids, or manipulatives, may include, but not be limited to, a plurality of dice, a numerical board, a plurality of pennies and cups designated for certain values such as "ones" and "tens." The physical training aids are used with a child in a way where the child can perform certain steps in an addition or subtraction problem and verify the answer by direct observation.

According to another aspect of the invention, a method for teaching arithmetic to a student is disclosed and has a first 10-sided die, respective sides of the die numbered consecutively from 0 to 9. The method also includes a numerical board having a plurality of spaces numbered consecutively from 1 to 20, a first marker and a second marker and a plurality of pennies. The student rolls the first die to show a first numerical value and places a first amount of pennies corresponding to the first numerical value aside and hidden from view. The student rolls the die again to show a second numerical value and places a second amount of pennies corresponding to the second numerical value aside and hidden from view. A question is created to the student of how many pennies have been set aside and hidden from view. A student places the first marker on the space of the numerical board corresponding to the first numerical value. The student counts consecutively a number of spaces on the numerical board from the space of the first marker, the number of spaces corresponding to the second numerical value and places the second marker at the space of the numerical board at the end of the counting. The student picks up the second marker to display a resulting value on the numerical board wherein the resulting value corresponds to the sum of the first numerical value and the second numerical value.

According to a further aspect of the method, the student counts the number of the pennies set aside and hidden from view wherein the amount of pennies set aside and hidden from view corresponds to the sum of the first numerical value and the second numerical value and further corresponds to the resulting value.

According to a further aspect of the invention, a system for teaching arithmetic to a student has a first 10-sided die, respective sides of the first die numbered consecutively from 0 to 9, and a numerical board having a plurality of spaces numbered consecutively from 1 to 20. The system further has a first marker, a second marker and a plurality of pennies. The student rolls the first die to show a first numerical value and from the plurality of pennies, places a first amount of pennies corresponding to the first numerical value aside and hidden from view. The student again rolls the die to show a second numerical value and from the plurality of pennies, places a second amount of pennies corresponding to the second numerical value aside and hidden from view. A question is created for the student as to how many pennies have been set aside and hidden from view. The student places the first marker on the space of the numerical board corresponding to the first numerical value, and wherein the student counts consecutively a number of spaces on the numerical board from the space occupied by the first marker, the number of spaces corresponding to the second numerical value and places the second marker at the space of the numerical board at the end of the counting. The student picks up the second marker to display a resulting value on the numerical board, the resulting value corresponding to the sum of the first numerical value and the second numerical value.

According to a further aspect of the system, the student counts the number of the pennies set aside and hidden from view wherein the amount of pennies set aside and hidden from view corresponds to the sum of the first numerical value and the second numerical value and further corresponds to the resulting value wherein the user confirms the accuracy of the resulting value.

According to a further aspect of the invention, the training aids can be applied in a multitude of different games for children to play. In playing the games, children apply the system and method of the present invention and become more proficient in arithmetic.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 8 is a perspective view of a game board used in a first game in an exemplary embodiment of the present invention, generally referred to as the Race To 100 game;

FIG. 10 is a plan view of a first level player table for the Race To 100 game;

FIG. 11 is a plan view of a second level player table for the Race To 100 game;

FIG. 12 is a plan view of a third level player table for the Race To 100 game;

FIG. 13 is a perspective view of a game board in the form of a replica dollar bill used in another game in an exemplary embodiment of the present invention;

FIG. 14 is a perspective view of the game board of FIG. 13 with additional training aids in the form of pennies used in the game;

FIG. 16 is a plan view of a player table for the Dollar Game;

FIG. 21 is a plan view of a first level player table for the Gravity Game; and

FIG. 22 is a plan view of a second level player table for the Gravity Game.

DETAILED DESCRIPTION OF THE PREFERRED EMBODIMENT

Figures 1, 2:
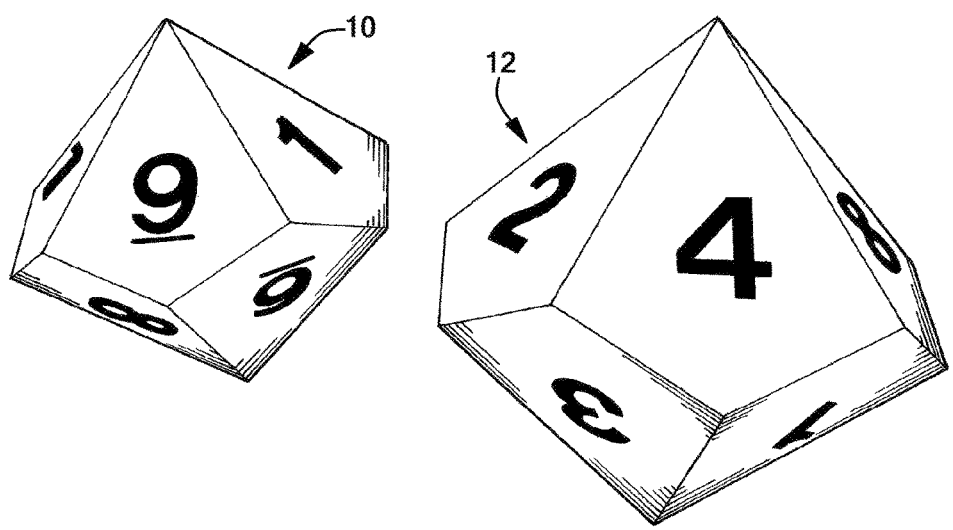
FIG. 1 is a perspective view of a plurality of training aids in the form of a pair of dice used in an exemplary embodiment of the present invention.
FIG. 2 is a perspective view of a numerical board used in an exemplary embodiment of the present invention.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIGS. 1-7 disclose a plurality of various physical training aids, or manipulatives, used in the system and method for teaching arithmetic according to an exemplary embodiment of the present invention. As further described below, the system and method can be applied to games children can play to further aid in the learning of arithmetic. The method can be used with a child as young as 4 years of age. It is further understood that the child needs to be able to count from 1 to 20 and recognize these numbers in printed form.

Figure 5:
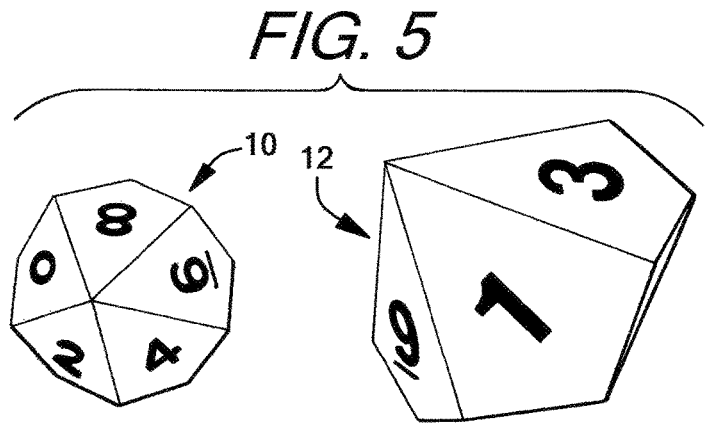
FIG. 5 is a perspective view of another plurality of training aids in the form of a second pair of dice of a different color used for a second child/player in an exemplary embodiment of the present invention.
Figure 6:
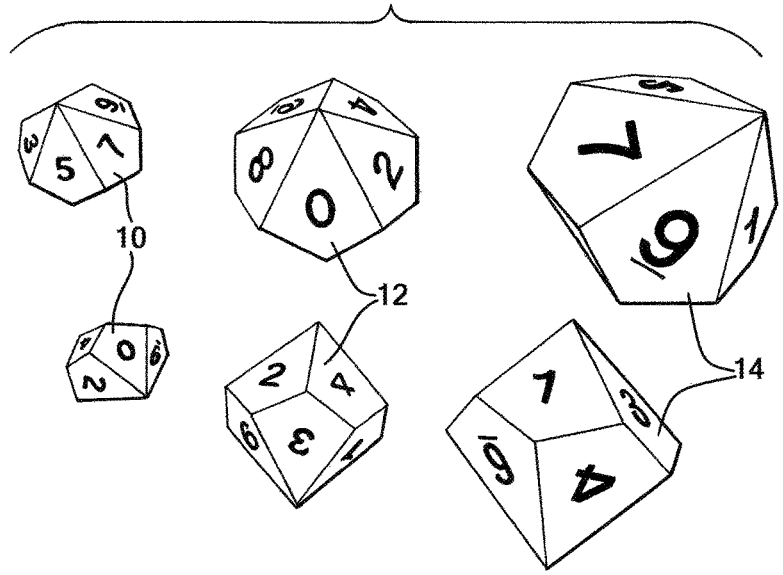
FIG. 6 is a perspective view of a further plurality of training aids in the form of pairs of dice that are of different sizes to represent a "ones" value, a "tens" value and a "hundreds" value used in an exemplary embodiment of the present invention.
Figure 7:
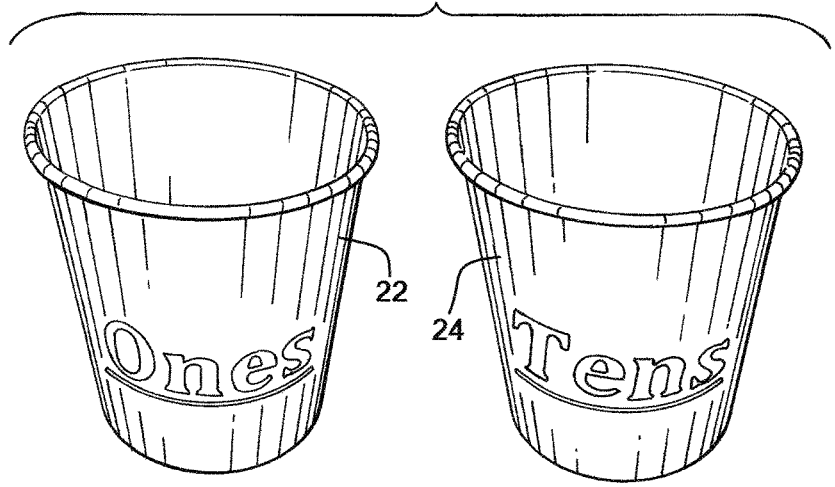
FIG. 7 is a perspective view of a first cup, or "ones" value cup, and a second cup, or "tens" value cup.

As further shown in FIG. 1-7, the system and method generally includes a plurality of physical aids, or manipulatives, in the form of a pair of 10-sided die pieces (FIG. 1), a numerical board (FIG. 2), a plurality of pennies (FIG. 4) that also may be used as markers, and a first cup (FIG. 3) and second cup (FIG. 7). The manipulatives may be designed and dimensioned to be capable of being hand-held by the children/students learning arithmetic.

FIG. 1 shows the pair of dice. A first die is generally designated with the reference numeral 10. As further shown, the first die 10 is configured to have 10 sides. The sides are connected to respective adjacent sides at particular angles to form a three-dimensional configuration. The three-dimensional configuration has a plurality of apexes formed by adjacent sides of the die 10 converging to form a respective apex. Each side is generally kite-shaped, and each side has a different numeral thereon. Thus, the respective 10 sides are demarcated from 0 consecutively to 9 in an exemplary embodiment. Different indicia configurations on the die 10 are also possible.

FIG. 1 also shows a second die generally designated with the reference numeral 12. The second die 12 is generally identical to the first die 10, but is slightly larger in size. As explained in greater detail below, the first die 10 may represent a "ones" value and the second die 12 may represent a "tens" value in the course of the children's games used with the method and system. As shown in FIG. 5, a second set of a first die 10 and a second die 12 can be used for a second child/player using the system and method of the present invention and to play the games of the invention described herein. The second set of the first die 10 and the second die 12 could have a different color to distinguish from the first set. As further explained, additional sized die may also be included for more advanced games. For example, FIG. 6 shows a third die designated with the reference numeral 14. The third die 14 is larger than the second die 12 and may represent a "hundreds" value to be used in other more advanced games. As further shown in FIG. 6, two sets of the first die 10, second die 12 and third die 14 can be included and in different colors if desired.

FIG. 2 shows the numerical board, generally designated with the reference numeral 20. The numerical board 20 is generally rectangular in shape and divided into four rows and five columns to define twenty separate squares 21 or spaces 21. Each square 21 is designated with a numeral from 1 consecutively to 20. The numerals commence from left to right and proceed from top to bottom as shown in FIG. 2. Thus, in an exemplary embodiment, the numerical board 20 has a first row of spaces 21 numbered consecutively from 1 to 5. The numerical board 20 also has a second row of spaces 21 numbered consecutively from 6 to 10. The numerical board 20 further has a third row of spaces 21 numbered consecutively from 11 to 15. Finally, the numerical board 20 has a fourth row of spaces 21 numbered consecutively from 16 to 20. The first row of spaces 21 is positioned at the top of the numerical board, the second row spaces 21 is positioned beneath the first row of spaces 21, the third row of spaces 21 is positioned beneath the second row of spaces 21, and the fourth row of spaces 21 is positioned beneath the third row of spaces 21. In this row/column configuration, the numerical board 20 possesses a smaller, more compact footprint than, for example, a number line from 0 to 20 that generally extends from left to right in a single row. As explained in greater detail below, the numerical board 20 having the smaller and compact footprint promotes more efficient learning by users. It is understood that numbering of the numerical board 20 could take other configurations. The size of the numerical board 20 can vary but generally dimensioned such that the divided squares 21 or spaces 21 are sized to receive a marker that may be in the form of a penny in an exemplary embodiment.

Figure 4:
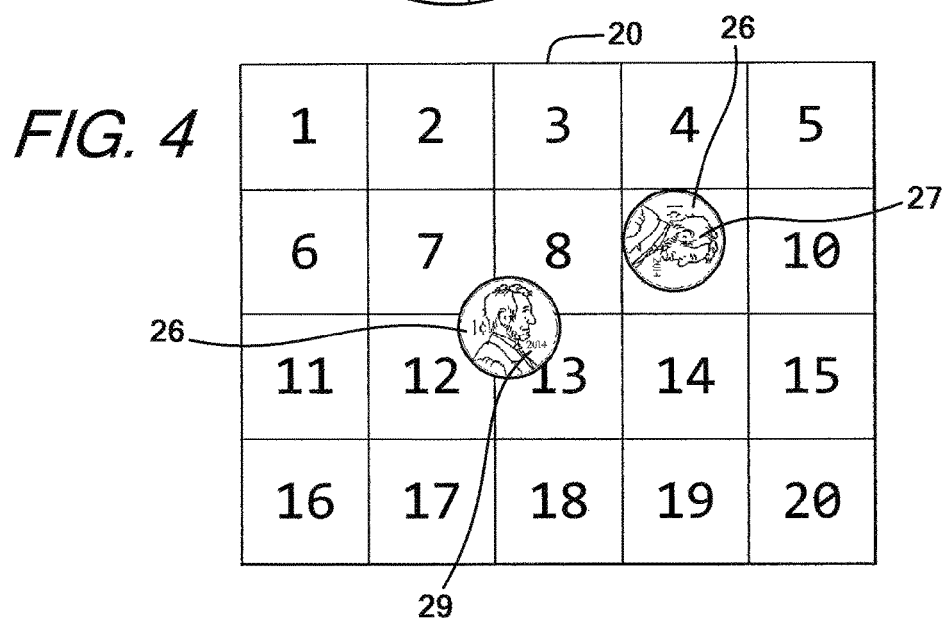
FIG. 4 is a perspective view of the numerical board of FIG. 2 with pennies used with the board in an exemplary embodiment of the present invention.

It is further understood that markers are used with the numerical board 20 for the system and method of the present invention. As shown in FIG. 4 and explained in greater detail below, a first marker 27 may be in the form of a first penny 27 and a second marker 29 may be in the form of a second penny 29. It is understood that the first marker 27 and the second marker 29 may be take other forms including a replica penny. The penny 26 as markers 27,29 is beneficial as it connotes a "ones" value helpful and familiar to students for counting and learning arithmetic. It is understood that the markers 27,29 could take other forms other than a penny.

Figure 3:
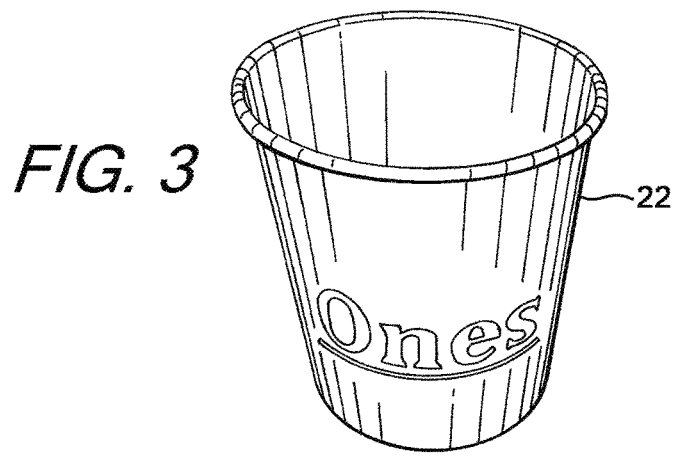
FIG. 3 is a perspective view of a "ones" cup used in an exemplary embodiment of the present invention.

FIG. 3 shows the container 22 or cup 22. The cup 22 has indicia thereon to designate the cup 22 as being for a "ones" value. As shown in FIG. 7, a second cup 24 can be included having indicia thereon to be a "tens" value. The cups 22,24 are standard containers used to hold pennies 26 used in the system and method of the present invention as described herein. The containers 22,24 can take other forms and have other indicia thereon to contain pennies therein. Other structures could also be employed to hide or obstruct the view of the pennies 26.

As part of the system and method, a large group of pennies 26, or plurality of pennies 26 is also used. As discussed, the pennies 26 are helpful and familiar to students as they represent a "ones" value. Pennies 26 are used in an exemplary embodiment, but other objects could also be used. The objects are capable of being counted and also preferably stacked or interconnected. The objects are also capable of being set aside, hidden, obstructed from view from the student, or otherwise removed from site of the student.

These physical training aids cooperate to form the system and method for teaching arithmetic to a student. Examples of the method will now be described. It is understood that an adult/teacher can work with a student that may be a child or multiple children at once. Again, it is understood that each child/student can count to at least twenty and recognize numerals from 0 to 20 in written or printed form. In the method, a large group of pennies 26 or plurality of pennies 26, the first die 10 and the second die 12, the numerical board 22, and the first cup 22 are placed before the child. In an exemplary embodiment, two pennies 26 are taken from the plurality of pennies 26 to serve as the first marker 27 and the second marker 29. By rolling the first die 10 and the second die 12, the child/student will create the arithmetic problems to be solved.

An example will now be described. The child rolls or tosses the first die 10. As an example, the die 10 shows the numeral "9" such as shown in FIG. 1. The child counts out 9 pennies 26 and sets aside and hides from view the 9 pennies. In an exemplary embodiment, the child sets aside and hides from view by placing the 9 pennies 26 in the cup 22. The child then repeats this step with the second die 12. As an example, child rolls the second die 12 and the second die 12 shows the numeral "4" such as shown in FIG. 1. The child counts out four pennies 26 and places the four pennies 26 into the first cup 22. An adult, parent, or teaching individual creates a question for the child/student to consider prior to proceeding. For example, the teacher can ask the child how many pennies 26 are in the cup 22. The adult may shake the first cup 22 and/or wave the cup 22 and pennies 26 therein making clattering sounds to create a fun atmosphere or environment of excitement for the child and further lessen the initial, natural intimidating environment existing when solving arithmetic problems. While the child may respond with an answer such as "I don't know" or venture a guess, the adult can respond such as "are you sure" or other response that will instill confidence in the child that the child has the knowledge and ability to easily find the number of pennies in the cup.

In a further step of the method, the numerical board 20 is used to find the sum of the numerals shown in the roll of the dice 10,12. As shown in FIG. 4, the numerical chart 20 is placed before the child and the child is given two markers. The first marker 27 is in the form of a penny 26 and the second marker 29 is in the form of a penny 26 in an exemplary embodiment. The adult asks the child what the value is of the first die roll. The child will recall it was "9" and has the child place a first marker 27 or first penny 27 on the "9" square on the board 20 that corresponds to the "9" of the roll of the first die 10. The adult also asks the child what the value is of the second die roll and the child will recall it was "4." From the "9" square, the child counts consecutively four squares (the amount corresponding to the roll of the second die 12) and places a second marker 29 or second penny 29 on that $4^{th}$ square from the "9" square. The adult tells the child that the number under the second penny 29 will always be the number of pennies in the first cup 22. The child lifts up the second penny 29 and sees the numeral "13" on the numerical board 20. As part of the method, the child can verify that the number of pennies 26 in the first cup 22 corresponds to the numeral "13." The child then counts the number of pennies 26 in the cup 24 and finds that there are 13 pennies 26 in the first cup 22. By counting the number of pennies 26 in the first cup 22, the child verifies the answer by direct observation. Thus, the value of the numerical board 20 under the second penny 29 is the resulting value corresponding to the sum of the numerical values of the die rolls, and also corresponds to the number of pennies 26 in the first cup 22. It is understood that these steps can be repeated with the child numerous times wherein the child can continuously verify answers by direct observation. In this fashion, the child readily learns the method of calculating by counting that gives the correct answer to the addition problem. The child will come to learn that the numerical board 20 will provide the resulting value and the resulting value will always correspond to the number of items in the container. With the 1-20 chart and the two markers or pennies 27,29, the child has the ability to find all of the addition number facts. With sufficient repetition, the child will naturally memorize these arithmetic facts. It is understood that the child creates the arithmetic problems randomly by rolling the first die 10 and the second die 12.

It is understood that subtraction can be taught to the child using the same concepts with the physical aids or manipulatives. For example, the dice 10,12 are rolled and pennies 26 corresponding to the greater die roll value are placed in the cup 22. The value of the roll of the second die 20 (or lesser die roll value) represents the number of pennies 26 for the child to take out of the first cup 22. The child places a penny 26 on the greater value on the board 22 and then the child counts backwards on the numerical board 20 based on the second die roll wherein the subtraction answer is under where the second penny 26 is placed. The child can verify the answer by counting the pennies remaining in the cup 24.

For example, a child rolls the dice 10, 12 and the first die 10 shows a first numerical value of "9" and the second die 12 shows a second numerical value of "4." The child determines the largest numerical value between the first numerical value and the second numerical value. Thus, initially using the die roll representing the larger number, the child counts out 9 pennies from the plurality of pennies and sets the pennies aside and hidden from view by placing the pennies into the cup 22 or container 22. Similarly, the child determines the smallest numerical value between the first numerical value and the second numerical value. Using the die roll representing the smaller number or smallest numerical value, the child takes pennies away, or takes pennies out of the cup 22, the number of pennies 26 corresponding to the die roll displaying the smaller number or smallest numerical value. The adult or teaching authority can create a question to the child regarding how many pennies remain in the cup 22. The numerical board 20 is placed before the child wherein the child places the first marker 27 on the 9 space of the board 20 and corresponding to the larger die roll. The child counts consecutively from the 9 space and backwards four spaces (corresponding to the numerical value of the roll of the second die 12, e.g. the smaller die roll) and places the second marker 29 on the 5 space of the numerical board 20. The adult tells the child that the number under the second marker 29 will always be the number of pennies in the cup 22. The child lifts up the second marker 29 and sees the numeral "5" on the numerical board 20. As part of the subtraction method, the child can verify that the number of pennies 26 remaining in the cup 22 corresponds to the numeral "5." The child then counts the number of pennies 26 in the cup 22 and finds that there are 5 pennies in the cup 22. By counting the number of pennies 26 in the cup 22, the child verifies the answer by direct observation. Thus, the value of the numerical board 20 under the second marker 29 is the resulting value corresponding to the difference of the numerical values of the die rolls, e.g., the difference of the largest numerical value and the smallest numerical value. The resulting value also corresponds to the number of pennies in the cup 22. It is understood that there may be occurrences where the roll of the first die 10 and the roll of the second die 12 are identical. For example, both die rolls may show a "7." In such an occurrence, the largest numerical value is determined as a "7" and the smallest numerical value is determined as a "7" and wherein the resulting value is determined as zero ("0"). It is also understood that these steps can be repeated with the child numerous times wherein the child can continuously verify answers by direct observation. It is further understood that the method and system can also be executed using a single die wherein the values of die rolls are tracked or remembered. Typically, addition concepts are focused on first with the child with subtraction concepts following thereafter.

This method using the physical aids/manipulatives (in particular the numerical board and pennies) and counting steps can further be incorporated into games played by the child with an adult and/or with other children. Once the child can use the physical aids in the system and method as described above, the child can apply those steps in the games to further master arithmetic facts. Playing the games repeatedly with the system and method of the invention helps a child to memorize the arithmetic facts. A teacher or adult can also supervise multiple children in playing the games. A plurality of different games are described herein. It is contemplated that additional games could be implemented that require understanding of more advanced arithmetic wherein such games are implemented after mastering the initial games described herein. For example, the games described herein focus on addition and subtraction where additional games may focus on multiplication and division.

FIG. 8 shows a game board 30 for a game that can be used with the method and system of the present invention for teaching arithmetic. The game may be referred to as the "Race To 100." As shown, the Race To 100 game board 30 is divided up into a grid of rows and columns. The grid defines 100 squares that are numbered from 1 to 100 consecutively. The numbered squares start at a periphery and progress around towards the center of the game board 30. In an exemplary embodiment, the number "1" square starts at an upper right corner of the game board 30. As further shown in FIG. 8, the numbered squares proceed from right to left on the top of the game board 30, down the left side of the game board 30, across the bottom of the game board 30 and then up towards the top of the game board 30. The numbered squares continue in this fashion until the numbered squares reach the "100" square proximate a center of the game board 30. It is understood the numbered squares could be configured in other patterns as desired, such as from the center of the game board 30 to an outer periphery of the game board 30. It is further understood that the Race to 100 game could be modified to focus on subtraction. For example, the game board 30 of FIG. 8 could be used in a subtraction based game wherein the players start at 100 and race to 0. Other modifications and configurations are also possible.

Figure 9:
FIG. 9 is a perspective view of the Race To 100 game board of FIG. 8 and showing a game piece.

A child can participate in a first level of play in the Race To 100 game where only a single 10-sided die such as the first die 10 is used. It is understood that each player can have a game piece 32 to move along the game board 30. It is understood that FIG. 9 shows a generic game piece 32. In one exemplary embodiment, the child/player may use an individual piece from the child/player that fits with the game board 30. Using a personal item as the game piece will make it more likely that the child/player has an increased interest in playing the game. In this first level of play, the child rolls the first die 10 to determine an initial value shown by the die 10. For example, the first die 10 may show a "9" such as shown in FIG. 1. The player counts 9 squares (corresponding to the roll of the first die 10) from square number "1" and places a game piece 32 on the number "9" square as shown in FIG. 9. Other players also take turns rolling the first die 10 and counting the squares and moving respective game pieces 32 accordingly. If an adult is playing, the child counts and moves the game piece 32 of the adult. With each sequential die roll, the player counts the squares to the new position on the game board. For example, if the child rolled the first die 10 in the next turn and the roll showed a "3," the child counts three squares and moves the game piece 32 to the number "12" square as indicated schematically in FIG. 9. The players continue to take turns rolling the die 10, and the first player to reach the number "100" square wins the game.

FIG. 10 shows a first level player table 34 that can be used to assist in keeping track of the player positions. Example rolls of the die 10 are recorded on the table 34. For example, the first roll of the die 10 was "9" which is recorded in the first row of the table 34. The next roll of the die 10 was "3" and is recorded on the next row and first column of the table 34. The player moves the game piece 32 from the "9" space, an additional 3 spaces to the "12" space. The player also records a "12" on the player table 34. Additional rolls the die 10 are recorded in successive fashion as shown, and the game piece 32 is moved on the game board 30 accordingly. With these steps, the child/student becomes more proficient in number recognition and arithmetic. The child/student experiences addition in its most basic form.

In a second level of play of the Race To 100 game, the child rolls the two 10-sided dice 10,12 and determines a sum as described above using the 1-20 numerical board 20. It is understood that while the first die 10 and the second die 12 could be used, two separate first die 10 could be used such as the same sized die pairs shown in FIG. 6. FIG. 11 shows a second level player table 36 that can be used to write down the numbers being added from the die rolls and sums determined. The child continues to roll the dice 10,12 and add the sum of the dice roll to the previous value. For example in the second level player table 36, the player rolled the dice 10, 12 and the dice showed a "5" and a "7." The player uses the method and system described above to determine the sum as "12." The game piece 32 is moved accordingly on the board position, and the board position is also recorded on the player table 36. On the player's next roll of the dice 10,12, a "4" and a "3" are shown. The player 36 uses the method described above to determine the sum as "7." As discussed, the player counts seven squares from the "12" position on the board wherein the "19" is recorded on the player table 36 and the game piece 32 is moved on the game board 30 to the "19" square. Additional rolls by the player are recorded in a similar fashion. The first player to reach 100 wins the game. Each player may use the second level player table 36 as shown in FIG. 11. The children use the system and method to add numbers and further add to the previous numbers. If an adult is playing the game, the adult will roll the dice and record on the player table 36. The child, however, should find the sum of the rolls of the adult and locate the new position of the game piece 32 on the board 30 for the adult.

The Race To 100 game further has a third level of play. The third level of play is generally the same as the second level of play as described above. FIG. 12 shows a third level player table 38 corresponding to the third level of play. Using the player table, the child uses vertical addition to find the new position on the board 30 before moving the game piece 32. If the child is required to perform a "carrying" operation as part of the addition, this is performed consistent with the Dollar Game as described below.

It is noted that at times during play of the Race To 100 game, a child may arrive at a wrong answer. It is advisable for the adult to never give the child the correct answer. Instead, the adult is advised to tell the child to count again or to use the numerical board 20 again. In this fashion, the child is forced to redo the operation until the correct answer is achieved.

Figure 15:
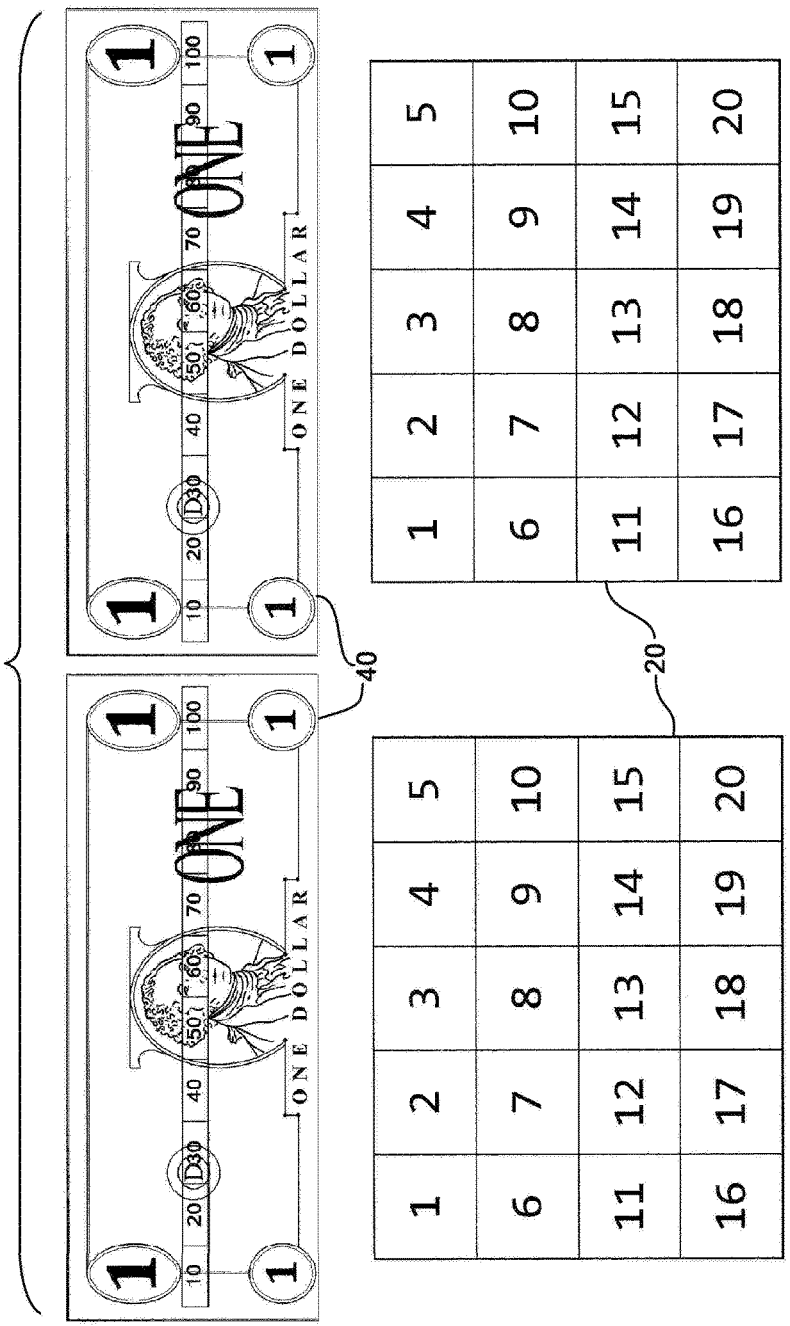
FIG. 15 is a perspective view of a pair of game boards of FIG. 13 and numerical boards of FIG. 2 used for multiple players of the first game.

A second game according to an exemplary embodiment of the present invention may be referred to as the Dollar Bill game. FIG. 13 shows a game board 40 that depicts a replica dollar bill. The replica dollar bill has 10 demarcations 42 starting at "10", then "20", then "30" and up to "100" by increments of 10. The objective of the game is to reach 100. A large amount of pennies 26 is placed in a central location before all of the players (e.g., enough pennies for each player to reach 100 pennies, or $1). Using the method described above, the first child tosses the first die 10 and then the second die 20. The child can use the numerical board 20 to determine the sum on the dice 10,12. For example, similar to the dice roll above, the child may reach 13. Once the child has at least a sum of ten, the child groups ten pennies 26 together. As shown in FIG. 14, the child has a "ten" group of pennies 44 that the child places on the "10" location on the dollar bill game board 40. In one exemplary embodiment, an adult may tape the group of ten pennies together. Any left-over pennies 26 are kept for the next roll. It is understood that the adult can create multiple groups of ten pennies 44 and place them in the second cup 24 marked "tens." The child can also save the groups of "tens" for uses in other games involving work with larger numbers. The child continues to roll and use the addition method described to accumulate additional groups of 10 pennies. These groups may be taped together if desired and placed on the "20" location, "30" location etc. Other children and the adult take turns rolling the dice and doing the same. FIG. 15 shows multiple replica dollar bill game boards 40 and numerical boards 20 such as for multiple players, e.g., a child and adult or multiple children players. The first player that reaches 100, or 10 groups of 10 pennies 44 wins.

FIG. 16 discloses a player table 46 for the Dollar Bill game. Example entries for Player A and Player B are entered on the table 46. For example, Player A rolled the dice 10,12 that resulted in an "8" and a "6." The next roll of the dice 10,12 resulted in a "4" and a "7." Player B rolled the dice 10,12 and the results are also recorded on the table 46. The Players continue to roll the dice 10,12 until one player has 10 groups of 10 pennies 44. It is further understood that the three sizes of the dice (FIG. 6) could be used to represent a hundreds value, e.g. ten groups of ten pennies 44 will represent 1 hundred, or a group of 100 pennies 26.

As discussed, the differently-sized die can be used to indicate "ones" values, "tens" values and "hundreds" values. The first cup 22, or "ones" value cup and the second cup 24, or "tens" values cup also indicate different values. Groups of 10 pennies can be taped together to form a "ten" group. Also, ten groups of "ten" groups can be taped together to form a hundred group. When a child plays a game such as the Dollar Game many times, eventually the child can hold 10 hundreds or one thousand pennies. The "ones" cup and the "tens" cup are also useful in demonstrating all of the difficulties that are encountered when adding or subtracting. In one example, twenty groups of "tens" and twenty "ones" may be kept in each respective cup to be used in explaining carrying and borrowing. These groups can also be useful in performing addition and subtraction problems of two 2-digit numbers, wherein only pennies are used in determining the answers. To generate the problems, 2 sets of 2 10-sided dice to generate the problems. Taped groups of "tens" could be used as a starting point. Another subtraction problem could be posed such as "30" (e.g., starting with three groups of "tens") minus "7." In order to subtract "7" from the "30," one of the taped "tens" group is un-taped so that seven pennies can be taken from the group. The child is then left with two "tens" groups and three individual pennies. Using such training aids, the child can better understand the concepts of carrying and borrowing.

Figure 17:
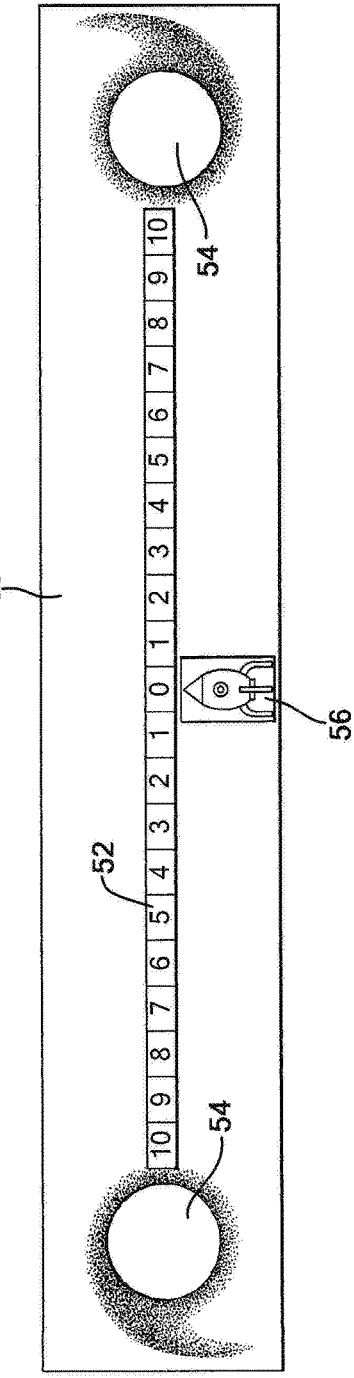
FIG. 17 is a perspective view of a game board used in another game in an exemplary embodiment of the present invention, and designated the Gravity Game.

FIGS. 17-22 show an additional game according to another exemplary embodiment of the present invention, and referred to as the Gravity Game. FIG. 17 shows a game board 50. The game board 50 has a number line 52 extending across the game board 50. The number line 52 is demarcated with a "0" at the center and further demarcated with the numerals 1-10 on one side and also with the numerals 1-10 on an opposite side. A "black hole" 54 is positioned at each end after the numeral "10." A game piece 56 in the form of a rocket ship is provided with the number line 52 and is positioned at the "0" location for the start of the game. As discussed below, the object is to move the game piece 56 into the black hole 54 which wins the game. There are two levels of play and there is a first level player table 58 and a second level player table 60 that can be used by the players while playing the game.

Figure 18:
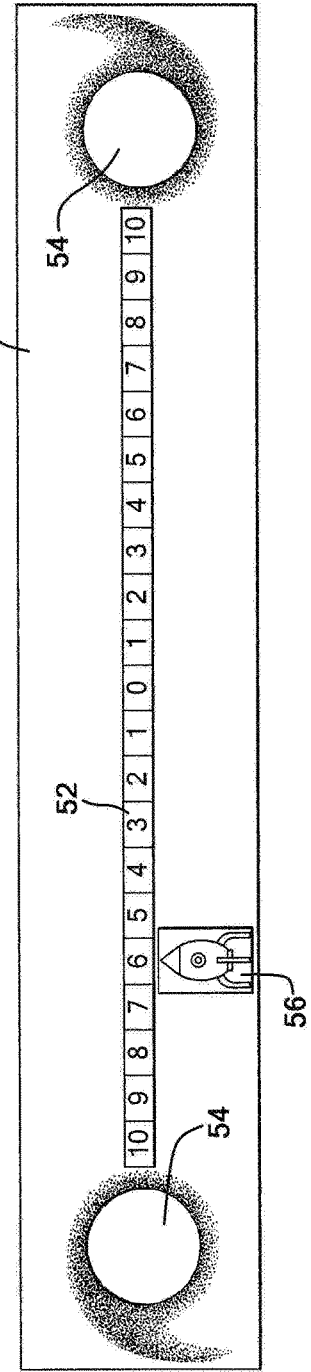
FIGS. 18-20 are perspective views of the game board of FIG. 17 showing a game piece at different locations along a number line of the game board.
Figure 19:
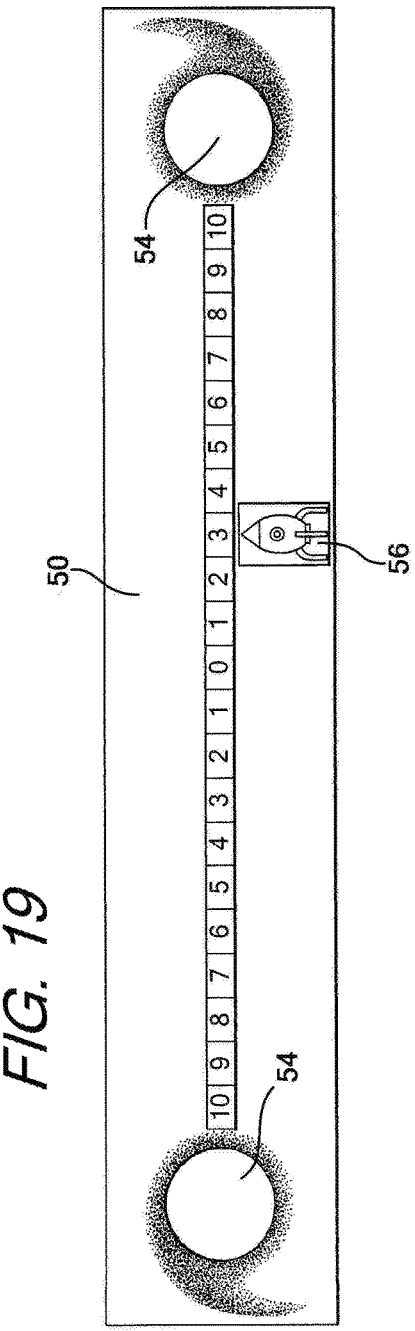
Figure 20:
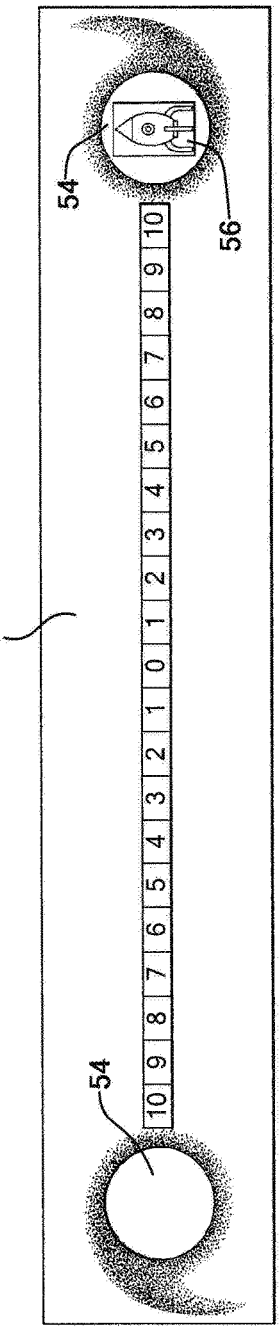

In a first level of play, each player throws a first die 10. An example is shown in the first level player table 58 in FIG. 21. Player A rolls a "7" while Player B rolls a "5." The player with the higher die score (Player A) then writes a subtraction sentence and determines the difference on the first level player table 58, e.g. "2." The Player can use the method described above using the physical training aids such as the pennies 26 and the numerical board 20. Player A then moves the game piece 56 two squares towards Player A's black hole 56. The players continue to roll the die 10 using the above steps. For example in the first level player table 58, the next die roll has Player A rolling a "3" and Player B rolling an "8." Player B writes the subtraction sentence and determines the difference as "5." Player B then moves the game piece 56 five spaces towards Player's B black hole 56, wherein the game piece 56 would be placed on space "3" of the Player B portion of the number line 52. FIGS. 18-20 show examples of the game board 50 with the game piece 56 at various locations of the number line 52 based on rolls of the die by the players. The players continue to roll the die 10 until one of the players gets the game piece 56 into the black hole 56 and therefore wins the game. It is understood that based on the values of the die rolls, the length of the game can vary greatly. The game could be over in two rounds or it could last for several rounds. The players could also play a best of 3, 5, 7 or 9 game series.

Figure 22:
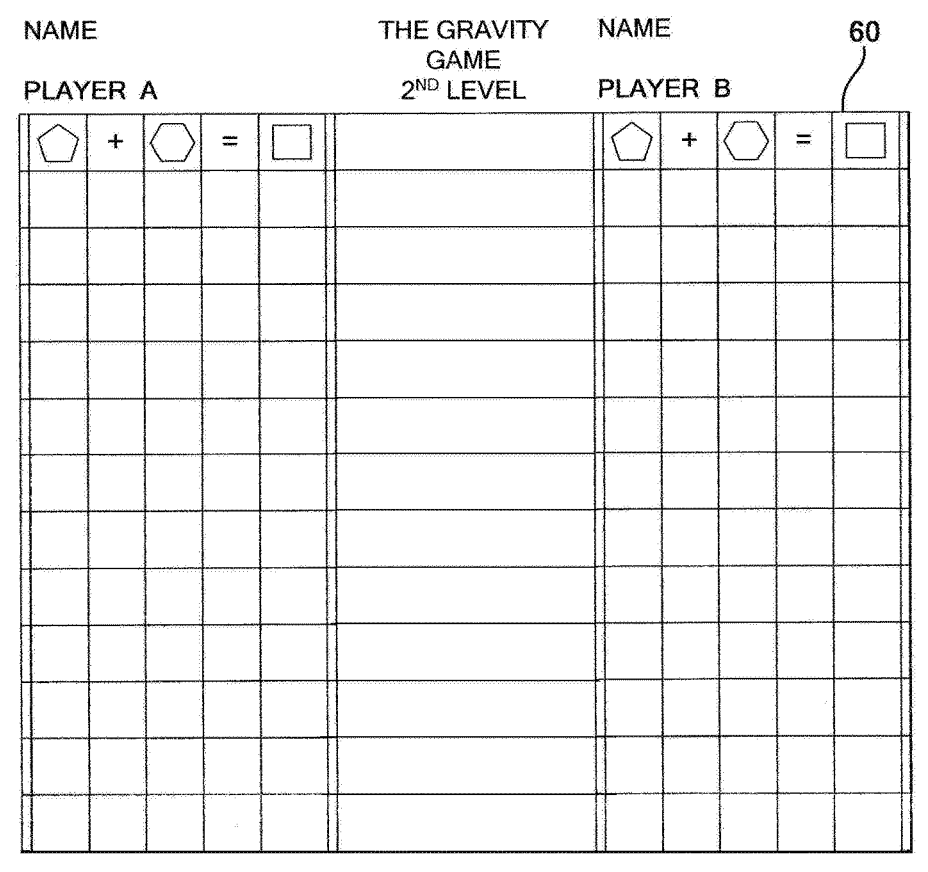

In a second level of play, each player rolls two die 10,12. Each player records the values in an addition sentence on the second level player table 60. The sums are recorded on the difference sheet of the first level player table 58. The player with the higher sum writes the subtraction sentence and determines the difference of the sums on the first lever player table 58. The player with the higher sum moves the game piece 56 toward that player's black hole 56 based on the difference value. FIGS. 22 and 21 provides an example of a first round. As shown in FIG. 22, Player A rolled two die wherein the first die revealed an "8" and a second die revealed a "7." Player A uses the process described herein and determines the sum to be "15." Player B rolled two die wherein the first die revealed a "3" and a second die revealed a "5." Player B uses the process described herein and determines the sum to be "8." As shown in FIG. 21, the players use the Difference sheet. Because Player A has the higher sum, Player A writes the subtraction sentence (located at a bottom of the player chart in FIG. 21) and determines the difference to be "7." Player A then moves the game piece 56 seven spaces toward the black hole 56. The above steps are repeated until the game piece 56 is drawn into a respective black hole 56 and there is a winner. Again, the length of the game in the second level of play can also vary greatly depending on the values of the die rolls.

It is understood that additional games are contemplated using the system and method of teaching arithmetic. The games can focus on addition and/or subtraction and can also be geared towards advanced levels using larger numbers as the players become more proficient in arithmetic. The games then become more challenging wherein the child players learn even more. It is further understood that the physical training aids can take other forms as well. For example, the pennies 26 can be modified to be in form of a different entity.

It is understood that the system and method of the present invention along with the games can illustrate additional mathematical concepts such as "carrying" or "regrouping." In one example, the child may be presented with a mathematical sentence such as "14+9=_____." This can easily be demonstrated by having the child take a group of ten pennies (e.g., taped together from the Dollar Game discussion) and also 4 additional pennies. The child also takes 9 pennies and then groups all of the pennies together. It is understood then that the child has one group of ten pennies and 13 additional pennies. The child may be asked what was done in the Dollar Game when there were 13 pennies. The child will respond that a group of ten pennies was taped together to make a group of ten. After making an additional group of ten, the child sees that there are two groups of ten and three additional pennies. The child can then easily conclude that the answer to the mathematical sentence is "23." The child learns that if there are enough pennies 26 to make a group of ten, it should be done. Similarly in more advanced concepts, if there are enough groups of ten to make a group of one hundred, it also should be done.

The concept of "borrowing" can also be demonstrated to the child with the system and method along with the games of the present invention. For example, the child may be presented with a mathematical sentence such as "20−7=_____." The child shows twenty by taking two groups of ten that are taped together from the cup marked TENS. The child is then asked to give 7 pennies to the adult or teacher from the two groups of ten. The child then removes the tape from one group of ten and creates 10 pennies 26. The child can now give the teacher the requested 7 pennies 26. The child then sees that there is one group of ten left and three pennies 26 which leads to the answer of "13." The child learns that if "ones" or single pennies are needed, they are taken from a group of ten. In further advanced concepts, if a group of ten is needed, it is taken from a group of one hundred.

The system and method of teaching arithmetic provides several benefits. As discussed, the present method and system allows children to learn arithmetic more easily and efficiently. The use of physical aids, or manipulatives, that are used during a game further promotes quick and efficient learning of arithmetic. Through the use of the manipulatives, students use various senses to touch and use the aids that help make visual representation of mathematical concepts. As can be appreciated from the above discussion, the system and method asks a question that requires the use of arithmetic to answer the question. The question is based on a physical entity present for observation by the child/player. The child/player will use counting techniques in the addition/subtraction processes. Once arriving at an answer, the child/player can count the physical entity present and thus verify the answer by direct observation. For example, the child/player can count the number of pennies in the cup to verify the answer. The child learns the relevant mathematical facts by continuously and repeatedly playing the games. The child also becomes more confident and empowered that the right answer will be arrived at because the child has observed the process providing the right answer repeatedly from performing the steps of the process. The child is confident in using the numerical chart and pennies to repeatedly play the games wherein the child memorizes the arithmetic facts. Thus, the child naturally progresses to knowing the arithmetic facts and it has been experienced that the child will know an answer before putting down the second marker and eventually no longer needs the numerical chart and other physical aids to arrive at a correct answer. The introduction of games also provides benefits. Because the child is playing games rather than doing tedious problems from a typical prior art worksheet, the attention span of the child is maintained throughout the process. Even when not playing the game but using the system and method steps, the adult can make the process and environment fun and exciting for the child with the creation of the questions and sounds generated with the physical training aids. This promotes thinking by the children rather than straight memorization. This learning experience is enjoyable and challenging to the child. Many studies have shown that incorporating playful aspects into a child curriculum promotes a natural enthusiasm for children in learning arithmetic. In sum, the child learns arithmetic more easily and efficiently resulting in the child having more pride in the achievement of learning. It has been found that prior art methods of teaching arithmetic can take from kindergarten through the second grade. The system and method of the present invention allows children to learn arithmetic significantly more quickly. Furthermore, it has been found that children as young as 4, 5 or 6 years of age have excelled in using the present system and method to learn arithmetic facts. Even other age groups that need assistance in arithmetic can benefit from the present system and method.

In addition, most prior art methods of teaching arithmetic require some prior knowledge of addition or subtraction. In the present system and method, the child is only required to recognize the numbers from 0 to 20 in printed form and be able to count from 0 to 20. No initial introduction to addition is necessary. By following the steps of the method and using the system of the present invention, the child will progressively learn the arithmetic facts. The child creates his/her own problems by rolling the die and follows the steps to solve the problems presented. By continuing with the method and system including being empowered to play the associated games, the child will memorize naturally the basic addition and subtraction facts. This learning provides a solid foundation for the child to proceed to more advanced mathematical concepts and operations. Certain games can be played at higher levels that require use of the concepts of regrouping, borrowing and carrying of numbers. Other games such as the Race to 100 and the Dollar Game can be played in reverse to demonstrate the concept of borrowing of numbers. Furthermore, the child is not subject to frequent testing such as with worksheets having multiple arithmetic problems. Mastery of the addition and subtraction facts can be noted by watching how often the numerical chart being used by the child. Overall, the system and method described herein assists in teaching more advanced mathematical concepts including carrying numbers and borrowing numbers, such as when working with larger numbers, even while memorizing the basic arithmetic facts.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A method for teaching arithmetic to a student, the method comprising:
   providing a first 10-sided die, respective sides of the die numbered consecutively from 0 to 9;
   providing a numerical board having a plurality of spaces numbered consecutively from 1 to 20;
   providing a first marker and a second marker;
   providing a plurality of pennies;
   rolling the first die to show a first numerical value and placing a first amount of pennies corresponding to the first numerical value aside and hidden from view;
   rolling the die again to show a second numerical value and placing a second amount of pennies corresponding to the second numerical value aside and hidden from view;
   creating a question to the student of how many pennies have been set aside and hidden from view;
   placing the first marker on the space of the numerical board corresponding to the first numerical value;
   counting consecutively a number of spaces on the numerical board from the space of the first marker, the number of spaces corresponding to the second numerical value and placing the second marker at the space of the numerical board at the end of the counting;
   picking up the second marker to display a resulting value on the numerical board, the resulting value corresponding to the sum of the first numerical value and the second numerical value.

2. The method of claim 1 further comprising the step of counting the number of the pennies set aside and hidden from view wherein the amount of pennies set aside and hidden from view corresponds to the sum of the first numerical value and the second numerical value and further corresponds to the resulting value.

3. The method of claim 1 further providing a second 10-sided die, respective sides of the second die numbered consecutively from 0 to 9, wherein the student rolls the second die to display the second numerical value.

4. The method of claim 1 wherein the numerical board has a first row of spaces numbered consecutively from 1 to 5, the numerical board having a second row of spaces numbered consecutively from 6 to 10, the numerical board having a third row of spaces numbered consecutively from 11 to 15, the numerical board having a fourth row of spaces numbered consecutively from 16 to 20.

5. The method of claim 1 further providing a container and wherein the step of placing pennies aside and hidden from view is performed by placing the pennies in the container.

6. The method of claim 1 wherein the first marker is a first penny and the second marker is a second penny.

7. The method of claim 1 further comprising the steps of providing a game piece and a game board divided into a plurality of spaces, wherein the student, in response to determining the resulting value corresponding to the sum of the first numerical value and the second numerical value, moving the game piece on the game board a number of spaces corresponding to the resulting value.

8. A method for teaching arithmetic to a student, the method comprising:
provproviding a first 10-sided die and a second 10-sided die, respective sides of each die numbered consecutively from 0 to 9;
providing a numerical board having a plurality of spaces numbered consecutively from 1 to 20, wherein the numerical board has a first row of spaces numbered consecutively from 1 to 5, the numerical board having a second row of spaces numbered consecutively from 6 to 10, the numerical board having a third row of spaces numbered consecutively from 11 to 15, the numerical board having a fourth row of spaces numbered consecutively from 16 to 20;
providing a plurality of pennies;
providing a container;
rolling the first die to show a first numerical value and placing a first amount of pennies into the container corresponding to the first numerical value;
rolling the second die to show a second numerical value and placing a second amount of pennies into the container corresponding to the second numerical value;
creating a question to the student of how many pennies have been placed into the container;
placing a first penny on the space of the numerical board corresponding to the first numerical value;
counting consecutively a number of spaces on the numerical board from the space of the first penny, the number of spaces corresponding to the second numerical value and placing a second penny at the space of the numerical board at the end of the counting;
picking up the second penny to display a resulting value on the numerical board, the resulting value corresponding to the sum of the first numerical value and the second numerical value; and
counting the number of the pennies in the container wherein the amount of pennies in the container corresponds to the sum of the first numerical value and the second numerical value and further corresponds to the resulting value.

9. A system for teaching arithmetic to a student, the system comprising:
a first 10-sided die, respective sides of the first die numbered consecutively from 0 to 9;
a numerical board having a plurality of spaces numbered consecutively from 1 to 20;
a first marker;
a second marker; and
a plurality of pennies,
wherein the student rolls the first die to show a first numerical value and from the plurality of pennies, places a first amount of pennies corresponding to the first numerical value aside and hidden from view, and wherein the student again rolls the die to show a second numerical value and from the plurality of pennies, places a second amount of pennies corresponding to the second numerical value aside and hidden from view, and wherein a question is created for the student as to how many pennies have been set aside and hidden from view, and wherein the student places the first marker on the space of the numerical board corresponding to the first numerical value, and wherein the student counts consecutively a number of spaces on the numerical board from the space occupied by the first marker, the number of spaces corresponding to the second numerical value and placing the second marker at the space of the numerical board at the end of the counting, wherein the student picks up the second marker to display a resulting value on the numerical board, the resulting value corresponding to the sum of the first numerical value and the second numerical value.

10. The system of claim 9 wherein the student counts the number of the pennies set aside and hidden from view wherein the amount of pennies set aside and hidden from view corresponds to the sum of the first numerical value and the second numerical value and further corresponds to the resulting value wherein the user confirms the accuracy of the resulting value.

11. The system of claim 9 further comprising a second 10-sided die, respective sides of the second die numbered consecutively from 0 to 9, wherein the user rolls the second die when rolling the die again.

12. The system of claim 9 wherein the numerical board has a first row of spaces numbered consecutively from 1 to 5, the numerical board having a second row of spaces numbered consecutively from 6 to 10, the numerical board having a third row of spaces numbered consecutively from 11 to 15, the numerical board having a fourth row of spaces numbered consecutively from 16 to 20.

13. The system of claim 9 wherein the first marker is in the form of a first penny.

14. The system of claim 9 wherein the second marker is in the form of a second penny.

15. The system of claim 9 further comprising a container wherein the student sets aside hides from view the first amount of pennies by placing the first amount of pennies in the container wherein the student sets aside and hides from view the second amount of pennies by placing the second amount of pennies in the container, wherein the user counts the number of pennies in the container to conclude that the number of pennies in the container corresponds to sum of the first numerical value and the second numerical value and also corresponds to the resulting value.

16. The system of claim 9 further comprising a game piece and a game board divided into a plurality of spaces, wherein the student, in response to determining the resulting value corresponding to the sum of the first numerical value and the second numerical value, moves the game piece on the game board a number of spaces corresponding to the resulting value.

17. A system for teaching arithmetic to a student, the system comprising:
a first 10-sided die, respective sides of the first die numbered consecutively from 0 to 9;
a second 10-sided die, respective sides of the second die numbered consecutively from 0 to 9;
a numerical board having a plurality of spaces numbered consecutively from 1 to 20, the numerical board having a first row of spaces numbered consecutively from 1 to 5, the numerical board having a second row of spaces numbered consecutively from 6 to 10, the numerical board having a third row of spaces numbered consecutively from 11 to 15, the numerical board having a fourth row of spaces numbered consecutively from 16 to 20;
a first marker in the form of a first penny;
a second marker in the form of a second penny;

a plurality of pennies; and
a container,
wherein the student rolls the first die to show a first numerical value and places a first amount of pennies from the plurality of pennies into the container corresponding to the first numerical value, wherein the user rolls the second die to show a second numerical value and places a second amount of pennies from the plurality of pennies into the container corresponding to the second numerical value, and wherein a question is created for the student as to how many pennies have been placed in the container, wherein the student places the first marker on the space of the numerical board corresponding to the first numerical value, and wherein the student counts consecutively a number of spaces on the numerical board from the space occupied by the first marker, the number of spaces corresponding to the second numerical value and placing the second marker at the space of the numerical board at the end of the counting, wherein the student picks up the second marker to display a resulting value on the numerical board, the resulting value corresponding to the sum of the first numerical value and the second numerical value, and wherein the student counts the number of the pennies in the container wherein the amount of pennies in the container corresponds to the sum of the first numerical value and the second numerical value and further corresponds to the resulting value wherein the student physically confirms that the sum of the first numerical value and the second numerical value corresponds to the resulting value.

18. A method for teaching arithmetic to a student, the method comprising:
providing a first 10-sided die, respective sides of the die numbered consecutively from 0 to 9;
providing a second 10-sided die, respective sides of the die numbered consecutively from 0 to 9;
providing a numerical board having a plurality of spaces numbered consecutively from 1 to 20;
providing a first marker and a second marker;
providing a plurality of pennies;
rolling the first die to show a first numerical value;
rolling the second die to a second numerical value;
determining the largest numerical value between the first numerical value and the second numerical value and setting aside a first amount of pennies corresponding to the largest numerical value;
determining the smallest numerical value between the first numerical value and the second numerical value and taking away from the pennies set aside, a number of pennies corresponding to the smallest numerical value;
creating a question to the student of how many pennies remain in the pennies set aside;
placing the first marker on the space of the numerical board corresponding to the largest numerical value;
counting consecutively backwards, a number of spaces on the numerical board from the space of the first marker, the number of spaces corresponding to the smallest numerical value and placing the second marker at the space of the numerical board at the end of the counting;
picking up the second marker to display a resulting value on the numerical board, the resulting value corresponding to the difference of the largest numerical value and the smallest numerical value.

19. The method of claim 18 further comprising the step of counting the number of the pennies remaining of the pennies set aside wherein the amount of pennies remaining corresponds to the difference of the largest numerical value and the smallest numerical value.

20. A system for teaching arithmetic to a student, the system comprising:
a first 10-sided die, respective sides of the first die numbered consecutively from 0 to 9;
a second 10-sided die, respective sides of the second die numbered consecutively from 0 to 9;
a numerical board having a plurality of spaces numbered consecutively from 1 to 20, the numerical board having a first row of spaces numbered consecutively from 1 to 5, the numerical board having a second row of spaces numbered consecutively from 6 to 10, the numerical board having a third row of spaces numbered consecutively from 11 to 15, the numerical board having a fourth row of spaces numbered consecutively from 16 to 20;
a first marker in the form of a first penny;
a second marker in the form of a second penny;
a plurality of pennies; and
a container,
wherein the student rolls the first die to show a first numerical value and rolls the second die to show a second numerical value, and wherein the student determines the largest numerical value between the first numerical value and the second numerical value and places a first amount of pennies corresponding to the largest numerical value into the container, and wherein the student determines the smallest numerical value between the first numerical value and the second numerical value and takes a number of pennies out of the container corresponding to the smallest numerical value, and wherein a question is created for the student as to how many pennies remain in the container, wherein the student places the first marker on the space of the numerical board corresponding to the largest numerical value, and wherein the student counts consecutively backwards, a number of spaces on the numerical board from the space of the first marker, the number of spaces corresponding to the smallest numerical value and places the second marker at the space of the numerical board at the end of the counting, and wherein the student picks up the second marker to display a resulting value on the numerical board, the resulting value corresponding to the difference of the largest numerical value and the smallest numerical value, and wherein the student counts the number of pennies in the container wherein the amount of pennies remaining in the container corresponds to the difference of the largest numerical value and the smallest numerical value.

* * * * *